UNITED STATES PATENT OFFICE.

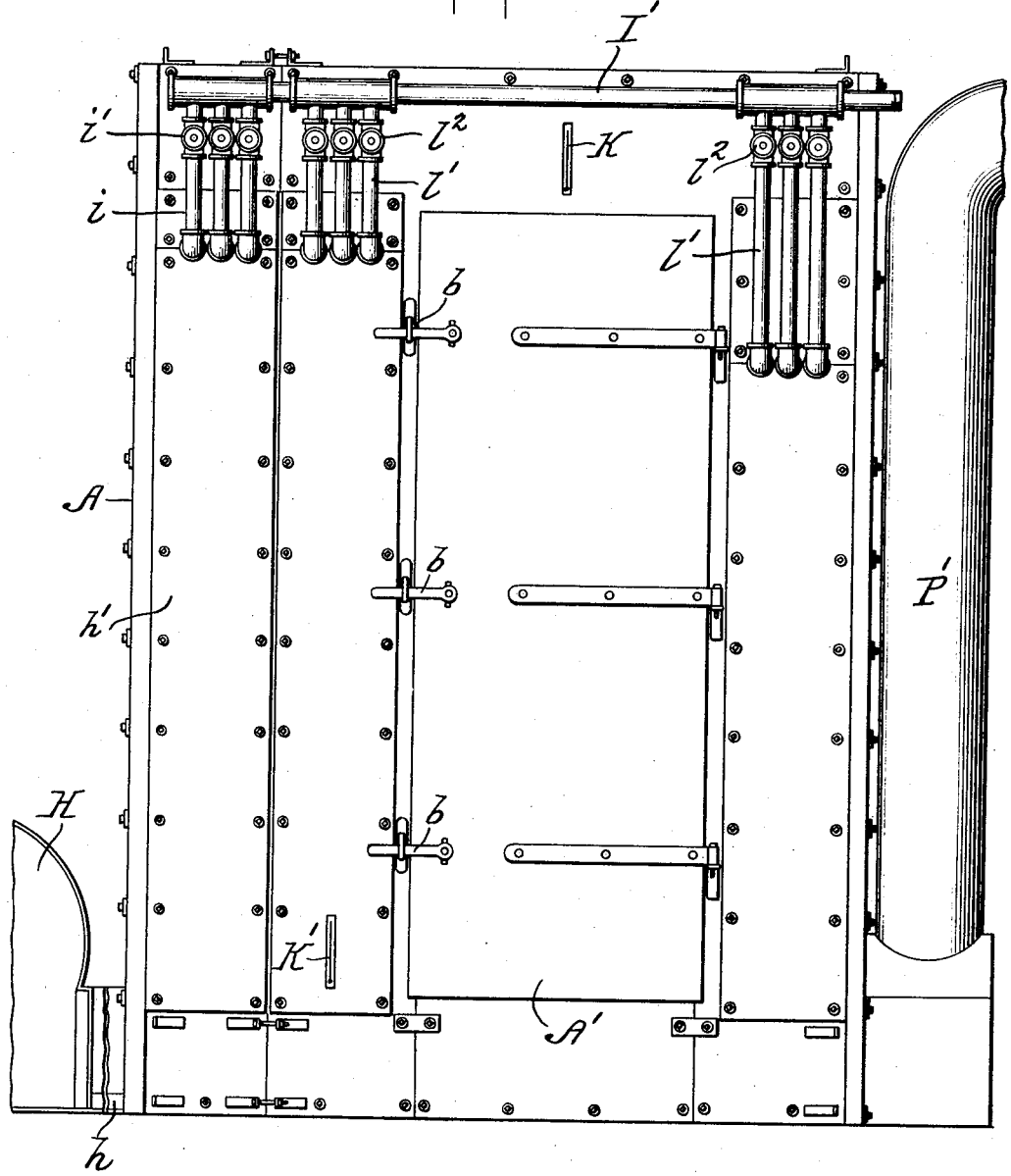

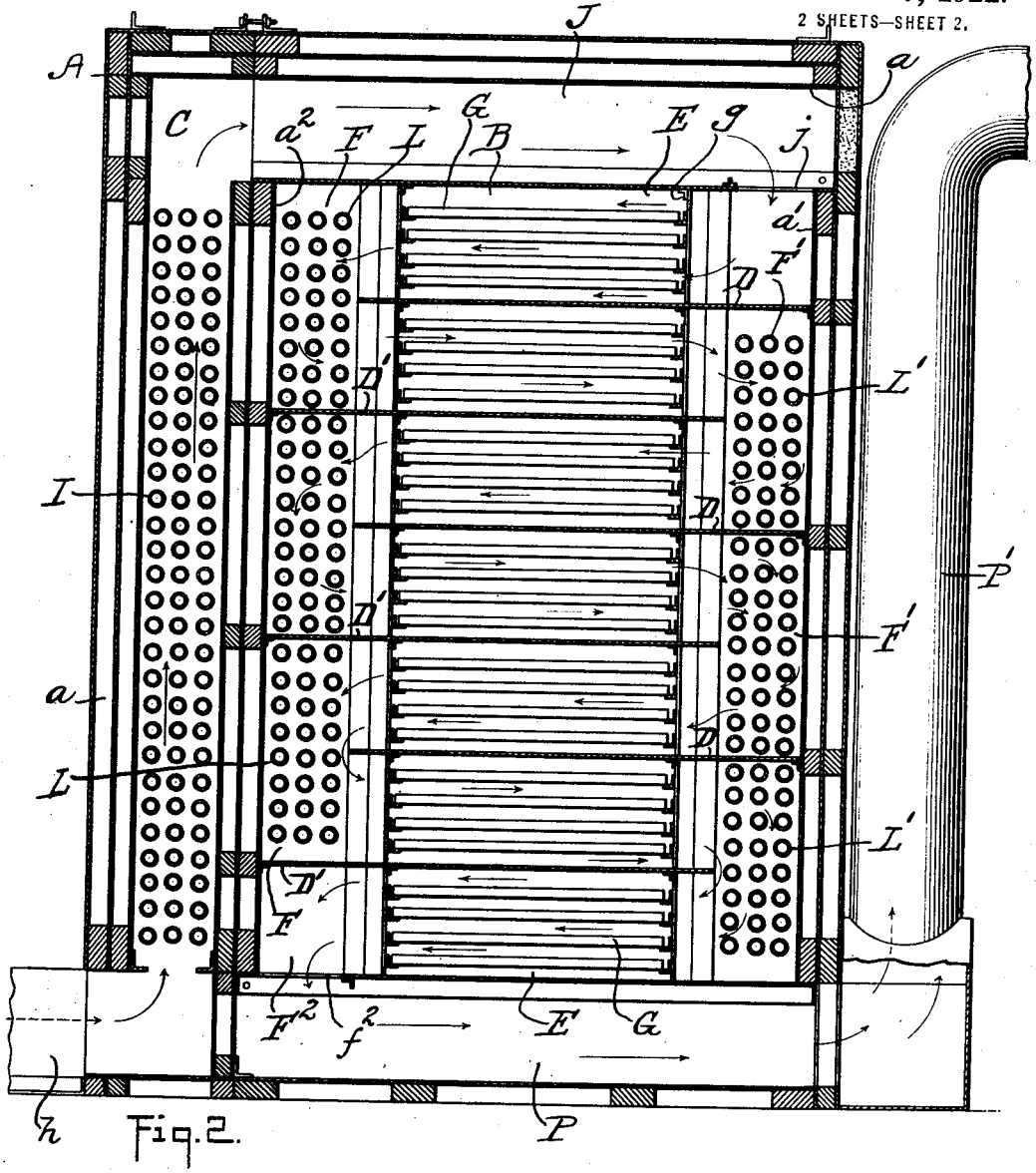

GORDON DON HARRIS, OF ISLIP, NEW YORK, ASSIGNOR TO NATIONAL EVAPORATOR CORPORATION, OF NEW YORK, N. Y., A CORPORATION OF NEVADA.

APPARATUS FOR EVAPORATING MOISTURE-CONTAINING MATERIALS.

1,405,780. Specification of Letters Patent. Patented Feb. 7, 1922.

Application filed December 26, 1917, Serial No. 208,784. Renewed April 25, 1921. Serial No. 464,256.

*To all whom it may concern:*

Be it known that I, GORDON DON HARRIS, a citizen of the United States, residing at Islip, in the county of Suffolk and State of New York, have invented a certain new and useful Apparatus for Evaporating Moisture-Containing Materials, of which the following is a specification.

This invention is an apparatus for evaporating moisture from different kinds of materials, such as paints and paint materials, fertilizers including humus and phosphates, peat, soap in bar or cake form, linoleums and other coated materials in web or sheet form, wood, fruit and vegetables, etc.

The objects of the invention are to rapidly evaporate moisture from the material under treatment, and, in the event that air is utilized as the drying medium, to effect economy in the consumption of the steam required to maintain said drying medium at a desired temperature throughout its flow into contact with all the masses of material with a view to securing efficiency of operation.

The leading feature of my invention is to effect the exchange of heat for moisture at a temperature which leaves each of several masses of material in a condition for the free transudation of moisture.

It may be explained that evaporators heretofore used perform the drying operation in such manner as (a) to produce upon the material under treatment a superficial coating, sometimes referred to as a skin or as "case hardening," the existence of which precludes to an appreciable degree the transudation of moisture through or from the mass (the interior thereof) and (b) the drying medium is circulated into contact repeatedly with masses of material under such conditions as to subject the mass or masses adjacent the heat inlet to a rapid exchange of heat for moisture, whereas the masses remote to the heat inlet are exposed to the action of the drying agent at a considerably decreased temperature owing to the loss of heat from drying agent due to the exchange of heat for moisture, as a result of which condition the application of the drying agent to the material must be continued for an undesirably longer period of time in order to efficiently dry the mass remote to the heat inlet, whereby the masses adjacent the heat inlet are in some instances dried to an excessive extent, and, further, a very considerable expenditure of steam is required for heating the drying agent to the desired temperature for such a prolonged period, necessitating the consumption of a large quantity of fuel for boiler maintenance.

According to this invention, means are provided for dividing a main chamber into compartments equipped for supporting the material in separated masses, said dividing means serving to isolate the masses of material and to direct a gaseous drying medium into a desired contact with said separated masses.

The drying agent is circulated, under pressure, into contact with the successive masses, during which flow of said agent the exchange of heat for moisture inevitably tends to lower the temperature of the agent as it circulates into contact with the masses remote to the heat inlet. According to my invention, this tendency to a decreased temperature is precluded by boosting the drying agent during its circulation, thus keeping said agent in an efficient condition for exchanging heat for moisture notwithstanding the repeated contacts of said agent with the moist material. Said boosting of the drying agent is secured by the use of reheaters positioned in the line of flow of the drying agent, said reheaters being arranged alternately to the material - supporting means, whereby the drying agent flows into contact with the material and then into contact with a booster or reheater, and then again into contact with the material, and so on throughout the apparatus.

As the moisture content varies with different materials, and as some materials are of such nature as to part with the moisture rapidly whereas other materials give up the moisture slowly, it is a matter of some importance to apply the drying agent at a temperature suited to the particular material, whereby the contact with the material of the drying agent, while exchanging heat for moisture, will leave said material and each mass thereof in a condition for the free transudation of moisture. Accordingly, the drying medium is preheated to a temperature apportioned to the moisture content of the first mass, so that the exchange of heat for moisture leaves said first mass in the desired transudatory condition, and as said drying agent circulates into successive contact with the masses other than the first one, said gaseous agent is boosted by repeated reheatings in a manner to compensate for the loss of heat due to the exchange of heat for moisture and ultimately result in keeping said drying agent at substantially uniform temperature throughout its circulation, whereby all of the series of masses of material are subjected to identical treatment with the primary purposes in view of leaving all the masses in the desired transudatory condition wherein any moisture present in any of the masses is free to pass to the surface of the mass so as to be carried off by the flow of the drying agent into contact with said masses.

More specifically stated, one form of the apparatus of this application embodies a suitable chamber the interior of which is subdivided by the employment of division walls or partitions so arranged as to produce a plurality of compartments for containing devices of one form or another for supporting material in separated masses within said compartments, said walls or partitions serving to isolate the masses and operating primarily to direct the flow of a gaseous drying medium into contact with said masses and to obtain a back and forth circulation within the chamber and successively through the compartments thereof. Said walls or partitions are arranged in alternate order, a certain number of the same extending in one direction from a wall of the chamber and other of said partitions extending from an opposite wall of the chamber so as to result in material compartments and heater compartments connected for the back and forth flow of the drying medium, usually air heated to a desired temperature. It is preferred, for economy of space, to provide each material compartment with means for supporting therein a plurality of trays adapted for supporting material in separated masses. The heater compartments are arranged at the ends of the material compartments, the depth of each heater compartment being equal to the depth of two material compartments and being in communication therewith so that the gaseous medium flows out of one material compartment, into a heater compartment wherein the direction of its flow is reversed, and thence into the next material compartment.

The apparatus may be constructed with any desired number of main chambers each sub-divided as specified, but it is preferred to construct the apparatus with a preheating chamber adapted for containing a heating coil the capacity of which is such as to preheat the gaseous drying agent (usually air) to a desired temperature apportioned to the nature of the material and the moisture content thereof. Such preheated air is conducted through a flue into the first material chamber so as to flow into contact with the masses of material therein adjacent the heat inlet, but as it flows out of this first chamber, said drying agent flows against the first of a series of boosters, the latter being positioned within the respective heater compartments.

Other features and advantages of the invention will appear from the following detailed description taken in connection with the drawings, wherein—

Fig. 1 is a front elevation showing my apparatus as a single unit.

Fig. 2 is a vertical sectional elevation thereof.

In the drawings there is shown a form of apparatus representing a unit of construction so far as concerns the means for supporting and treating certain masses of material; but it is to be understood that the capacity of the apparatus may be multiplied to an indefinite extent by increasing the number of units and connecting them in order with a view to utilizing the preheated drying medium flowing out of the first unit and successively through the other units of the apparatus.

The exterior casing or housing A is preferably double walled to produce air spaces $a$ for heat insulation. Within said housing or casing is a main chamber B and a preheater chamber C, said main chamber being sub-divided by horizontal partitions or division walls D D'. Certain of said partitions (D) extend from a wall $a'$ of chamber A to points near the opposite wall $a^2$, whereas other of said partitions (D') extend from said opposite wall $a^2$ to points near the wall $a'$, said partitions D D' being of such length and relatively arranged to produce a series of material compartments E and two series of other compartments F F'. Compartments E extend horizontally and are arranged one below the other, whereas the compartments F F' are at the ends of compartments E, it being preferred that each compartment F or F' shall exceed in depth the depth of the individual compartments E or that each chamber F or F' shall be equal in depth to two material chambers E E, although this is not essential.

By reference to Figure 2 it will be seen that the partitions D D', or their equivalents, are positioned within the main chamber so as to establish a tortuous circulating or flow passage, the same comprising the compartments E F F' just described. Said tortuous flow passage is of substantially uniform cross section, said cross section of the passage being small in relation to that of the main chamber, and the uniform cross section being an advantage, from a practical standpoint, for the reason that it offers no impedance to the flow of the drying medium, at the desired volume and speed, through said passage.

Within each material compartment is positioned a series of devices of one form or another for holding a series of separated masses of material. As shown, a desired number of trays G are supported within each chamber E, each tray G being supported upon rails or angle irons $g$ secured within the material chamber E. The trays G within each chamber E are positioned one below the other and spaced as shown in Fig. 2, whereby the trays G operate to subdivide the current of the gaseous drying medium circulating within chamber E, and said trays operate also to direct the gaseous drying medium into intimate contact with the material resting upon the trays. It is apparent that each tray G may be withdrawn from the chamber E, the dried material removed therefrom and the tray refilled, after which the filled tray with moist material is reinserted into the machine. The material chambers E and the trays G therein all occupy a definite vertical space within the apparatus A, and a part of the housing or casing is constructed with a hinged door A' adapted to be fastened in a tight condition by suitable catches $b$, whereby the door A' may be opened to permit access to the trays G.

Means are provided for circulating a drying medium under pressure through the unit of the apparatus herein disclosed and successively through each of the added units of said apparatus. Said drying medium is usually air which is blown into chamber C by the action of a blower H, the outlet $h$ of which blower is connected with the lower part of the chamber C. Within this chamber is a preheater, herein shown as a succession of coils I, the preheater being of such capacity as to raise the air to a desired temperature. As shown, the coils I extend from the lower to the upper part of chamber C, and one wall of this chamber, indicated at $h'$ in Fig. 1, is a face plate adapted to be removed should it be desired to obtain access to the preheater coils I. The heating medium may consist of steam, hot water, etc., the same being supplied through a feed main I' extending along the upper front part of the apparatus, said feed main being provided with depending branches $i$, each having a cock or valve $i'$, thus making provision for controlling the supply of steam to the coils of the preheater.

Connected with the upper portion of preheating chamber C is an intake flue J extending along the upper portion of the apparatus, the outlet $j$ from which flues lead directly into one chamber F' of the series of said chambers at one end of the material trays G, thus providing for the inflow of preheated air into the first material chamber E of the series.

Within the chambers F F' are coils L L', respectively, said coils operating as reheaters for boosting the air to a desired temperature during the circulation of the air back and forth within the main chamber B and successively through the material chambers E and heating chambers F F'. Any desired number of the coils may be employed to form each reheater or booster L L', but it is preferred to employ a sufficient number of coils in each booster to substantially fill the chamber F or F'. The reheater extends from the top portion of said chamber and practically from side to side thereof, so that the depth of the reheater coil is equal substantially to the depth of two material chambers G. The coils L of the reheaters in one series are separated by the partitions D', whereas the coils L' of the reheaters in the other series are separated by the partitions D. Steam is supplied to the reheaters L L' from the main I' through the agency of pipes $l'$ $l'$, each having a valve $l^2$ whereby the flow of steam from the main to the reheater coils is adapted to be regulated and controlled in a manner to raise the temperature of the reheater coils to points necessary for boosting the air as it circulates through the chambers F F', as a result of which the air is kept at a temperature and in a condition for treating the material on the trays G in a manner to effect the desired exchange of heat for moisture while leaving each mass of material in a transudatory condition.

The air circulating through the chambers becomes, by reason of its contacts with the masses of material, saturated more or less with moisture, although the temperature of the air is kept uniform by the boosting or reheating to which said air is subjected during its back and forth circulation within the main chamber B. The air flows from a delivery chamber $F^2$ through a port $f^2$ into a bottom flue P, to which is connected an eduction pipe P', but in case the air flowing from one unit is to be subsequently utilized, the air is conducted through other units provided with trays and reheaters of the character hereinbefore described.

The operation is as follows:—

The trays are loaded with material and introduced into the compartments E by sliding them upon the rails $g$, after which the door A' is closed and secured tightly so as to minimize the leakage of air. Steam having been supplied to the coils I and to the reheaters L L', the blower H forces air in the required volume and under the desired pressure through the flue $h$ into the chamber C. The contact of air with coils I preheats the air to a desired temperature, the air flowing through the flue J and entering the first end chamber through the port $j$. Air flowing through the first chamber E is sub-divided by the trays G which operate to direct the air into the desired contact with the masses of material upon the trays, such contact of preheated air with the material effecting the exchange of heat for moisture and leaving the material in said masses in the desired transudatory condition. It is apparent that the air flowing into contact with the moist material becomes reduced in temperature, but as said air flows into the first chamber F it is in contact with the coils of the reheater L, the action of which is to reheat the air to the desired or predetermined temperature, for the reason that the air flows through the spaces and downwardly between the coils of the reheater. By flowing through the first chamber F, the direction of the current of air is reversed and it is sent in an opposite direction through the second chamber E, the trays in which divide the air and direct said air into contact with the material. As it flows through the second chamber the air exchanges heat for moisture and its temperature is reduced, but the air flowing into the first chamber F' is reheated by the booster L' before it flows into the third chamber, and thus the air flows successively through the material chambers and the heater chambers, so that the air is in contact alternately with the masses of material and with the boosters. The partitions D D' operate to isolate the masses of material and primarily direct the preheated air in a back and forth course through the main chamber and successively through the material chambers and the heater chambers.

By reference to Figure 1 of the drawings it will be noted that the heating medium, such as steam, is supplied through a main I' to the initial heater I and to the two series of boosters or reheaters L L', provision being made for controlling the flow of the heating medium (steam) to said initial heater and to the boosters or reheaters as may be required for boosting the air so as to maintain the temperature constant. From the main I' extends a series of valved branch pipes $i$ which lead to the initial heater I for feeding thereto the steam required to initially heat the air to a temperature apportioned to the moisture content of the masses of material on the trays in the first cell or compartment B. Other branch pipes $l'$ lead from the steam supply main I to the boosters L L', one for each booster, and the valves $l^2$ in these branch pipes $l'$ are controllable at will for feeding steam as required to the boosters L L' of the two series, whereby said boosters L L' are effective in reheating the air as it flows from one cell to the next cell in order to attain that condition of the air wherein its temperature is constant notwithstanding the exchange of heat for moisture, as a result of which boosting or reheating of the air the material on the last trays and on the intermediate trays is subjected to the same treatment as the material on the trays in the first of the cells or chambers.

The material on each tray G from top to bottom of the chamber B is subjected to identical, or substantially identical, treatment by the contact of the drying air with the separated masses of material, a condition unattainable in prior drying machinery for the reasons hereinbefore explained. Such treatment is due to two main factors, ($a$) the temperature of the air is apportioned to the moisture content of the mass so that drying will not take place so rapidly as to produce the superficial coating on the mass and while the desired exchange of heat for moisture is effected the mass is left in the transudatory condition, and ($b$) the drying air is in the intervals between its contacts with the successive masses boosted by reheating the same in order to maintain the air at the desired or a predetermined temperature so that in the flow of the air into successive contact with masses other than those adjacent the air inlet, said flowing air will be at the same temperature as it was at the time of its inlet, and, also, to obtain the same effect upon the subsequent masses. As an aid in ascertaining the temperature of the drying medium, a thermometer K is positioned at the induction flue J, and a similar thermometer K' is at the lowest compartment $F^2$ next to the eduction flue P, whereby the attendant is enabled to ascertain that the air outflowing through flue P is at the same temperature as the air flowing into the apparatus at flue J, and should there be an appreciable decrease in the temperature of the outflowing air at K' then steam is supplied to the boosters so as to increase the heating effect in order to raise the temperature of the air to a desired degree.

Although I have stated that air is used as the drying medium, it is not desired to limit the invention to this particular agent, as boiler room gases may be used in treating some kinds of material, such as peat.

Having thus fully described the invention, what I claim as new and desire to secure by Letters Patent is:

1. An apparatus for evaporating moisture-containing materials comprising a main chamber, division walls positioned within said chamber for sub-dividing the latter into a plurality of compartments, means for circulating a gaseous drying medium, a plurality of material supporting devices within each compartment, said division walls being positioned for directing the gaseous drying medium through the successive compartments and into contact with the masses of material with said compartments, and a plurality of boosters positioned in the line of flow of the gaseous drying medium and adjacent the material-supporting devices whereby said drying medium flows into contact alternately with the masses of material and the boosters.

2. An apparatus for evaporating moisture-containing materials comprising a main chamber, a series of horizontal partitions positioned in parallel order within said main chamber for sub-dividing the latter into separate compartments, certain of said partitions extending from one wall of said chamber and other partitions extending from an opposite wall of said chamber so as to produce other compartments at the ends of the first named separate compartments, means for supporting material in separated masses within the first named separate compartments, means for circulating a heated gaseous drying medium, said partitions directing the flow of said drying medium into contact with said material and through the separate compartments and other compartments successively, and boosters located within the other compartments and in the path of the gaseous drying medium.

3. An apparatus for evaporating moisture-containing materials comprising a main chamber, a series of horizontal partitions positioned in parallel order within said main chamber for sub-dividing the latter into separate compartments, certain of said partitions extending from one wall of said chamber and other partitions extending from an opposite wall of said chamber so as to produce other compartments at the ends of the first named separate compartments, boosters located in said other compartments and each presenting heatable surfaces extending across the ends of two separate compartments, and means for circulating a gaseous drying medium, said partitions directing the flow of said drying medium through the successive compartments and into contact with the successive boosters so that the drying medium flowing out of one compartment is in contact with a booster prior to flowing into the next compartment.

4. An apparatus for evaporating moisture-containing materials comprising a main chamber, a series of horizontal partitions arranged within said main chamber for subdividing the latter, said partitions being so related to each other and to the walls of said main chamber as to produce a series of relatively shallow material chambers and other chambers the depth of which other chambers exceeds the depth of the individual shallow chambers, means for circulating a drying medium, and reheaters or boosters positioned within said other chambers and in line of flow of the drying medium whereby the drying medium flows into contact alternately with the masses of material and the reheaters.

5. An apparatus for evaporating moisture-containing materials comprising a main chamber, a series of horizontal partitions within said chamber, certain of said partitions extending from one wall of the chamber and the alternate partitions extending from the opposite wall thereof and said partitions being of such length and so related as to produce a series of material chambers and a series of other chambers, means for circulating a drying medium, said partitions operating to direct said drying medium through the material chambers and said other chambers successively, and reheaters positioned within the other chambers and in the line of flow of the drying medium.

6. An apparatus for evaporating moisture-containing materials comprising a main chamber, a series of horizontal partitions within said chamber, certain of said partitions extending from one wall of the chamber and the alternate partitions extending from the opposite wall thereof and said partition being of such length and so related as to produce a series of material chambers and a series of other chambers, a plurality of material-holding trays positioned within each material chamber, said trays within each chamber being relatively spaced and operating to sub-divide the drying medium flowing therethrough and to direct said drying medium into contact with the material upon the trays, means for circulating a drying medium, and reheaters positioned within the other chambers and in the line of flow of the drying medium.

7. An apparatus for evaporating moisture-containing materials comprising a main chamber, horizontal partitions within said main chamber for subdividing the latter into a series of material chambers, means for circulating a drying medium, said partitions operating to direct the drying medium in a back and forth direction within the main chamber and successively through the subdivided or material chambers therein, a plurality of material holding trays positioned within each material chamber, said trays being arranged in parallel order and operating to subdivide the drying medium flowing through said material chamber and to direct said drying medium into contact with material upon the trays, and reheaters adjacent to the trays and in the line of flow of the drying medium.

8. An apparatus for evaporating moisture-containing material comprising a main chamber, horizontal partitions within said main chamber for subdividing the latter into a series of material chambers, means for circulating a drying medium, said partitions operating to direct the drying medium in a back and forth direction within the main chamber and successively through the subdivided or material chambers therein, means for preheating said drying medium to a predetermined temperature, a plurality of devices within each material chamber for holding the material in separated masses therein, said material holding devices within each chamber operating to subdivide the drying medium circulating through each material chamber and to direct said drying medium into contact with the masses of material, and means for reheating the drying medium in the intervals between its contacts with the masses of material.

9. An apparatus for evaporating moisture-containing material comprising a main chamber, horizontal partitions arranged therein for producing a series of material chambers and other chambers the depth of which other chambers exceeds the depth of the individual material chambers, means for circulating air, means for preheating air to a desired temperature, said partitions operating to direct the preheated air back and forth within the main chamber and successively through the material chambers and other chambers, a plurality of trays within each material chamber, said trays operating to subdivide the air flowing through said material chamber and to direct the air into contact with the material upon the trays, and reheaters positioned within said other chambers and in the line of flow of the preheated air for contact ther with alternately with the contacts of said air with the material.

10. An apparatus for evaporating moisture containing materials embodying division walls relatively positioned for producing a series of material chambers, means for supporting material in separated masses within said chambers, there being a plurality of material supporting means within each chamber and said material supporting means being relatively spaced to produce flow channels intermediate said separated masses within each chamber, and said material supporting means being relatively spaced to produce flow channels intermediate said separated masses within each chamber, means for circulating a gaseous drying medium through said chambers successively, and boosters positioned in the line of flow of said drying medium, one of said boosters being positioned adjacent the exit from each chamber and the inlet to the next succeeding chamber of the series for reheating the air to maintain the temperature constant.

11. An apparatus embodying division walls relatively positioned for producing a series of material chambers, means for supporting material in separated masses within said chambers, there being a plurality of said material supporting means within each chamber and said material supporting means in each chamber being relatively spaced for producing flow channels between the separated masses, means for circulating a gaseous drying medium through the chambers and to establish the flow of said drying medium through the flow channels and into contact with the separated masses, certain of said division walls operating to isolate the separated masses in one chamber from the similar masses in the next chamber and said division walls directing the flow of said drying medium successively through said chambers, and boosters in the line of flow of the drying medium, one of said boosters being positioned adjacent the exit from each chamber and the inlet to the next succeeding chamber for reheating the air to maintain the temperature constant.

12. An apparatus embodying division walls relatively positioned for producing a series of material chambers, means for supporting material in separated masses therein, means for circulating a gaseous drying medium through the first chamber of the series and through the remainder of said chambers, certain of said division walls operating to isolate the masses of material and to direct the flow of said drying medium through the chambers successively, indicating means positioned for indicating the temperature of the drying medium as it flows into the first chamber, boosters in the line of flow of the drying medium for reheating the air to maintain the temperature constant, and other indicating means positioned for indicating the temperature of the air flowing within the chambers.

13. An apparatus embodying division walls relatively positioned for producing a series of material chambers, means for supporting material in separated masses therein, means for circulating a gaseous drying medium through the first chamber of the series and through the remainder of said chambers, certain of said division walls operating to isolate the masses of material and direct the flow of said drying medium through the chambers successively, a temperature indicating device positioned adjacent the inlet to the first chamber for denoting the temperature of the drying medium flowing into said chamber, boosters in the line of flow of the drying medium for reheating the same to maintain the temperature constant, means for controlling the boosters to regulate the heat thereof, and another temperature indicating device remote from the first temperature indicating device and positioned for indicating the temperature of the drying medium as it flows out of the final chamber of the series.

14. In an apparatus for evaporating moisture-containing materials, a plurality of material chambers, a plurality of material-supporting devices positioned within each chamber, said material-supporting devices within each chamber being relatively spaced and producing a number of flow channels within the chamber wherein said devices are positioned, means for circulating a drying medium through said chambers successively, and boosters positioned in the line of flow of said drying medium and intermediate the groups of said material-supporting devices.

15. In an apparatus for evaporating moisture-containing materials, a succession of material-cells or chambers, a nest of material-supporting devices, positioned within each cell or chamber, the material-supporting devices comprised in each nest being relatively spaced to produce a plurality of flow chambers within each cell or chamber, means for circulating a drying medium through said cells or chambers successively, said material-supporting devices operating to direct the drying medium through said flow channels within each cell or chamber, and means for reheating the drying medium during the flow from one cell or chamber to the next cell or chamber.

16. In an apparatus for evaporating moisture-containing materials, a succession of material cells or chambers, a nest of material-trays positioned within each cell or chamber, the material trays of each nest being relatively spaced for producing a plurality of flow channels within each cell or chamber, means for circulating air through the cells or chambers successively, said material-trays operating to direct the flow of air through the flow channels within each cell or chamber, and boosters positioned in the line of the air and intermediate the exit from one cell or chamber and the inlet to the next cell or chamber.

17. In an apparatus for evaporating moisture-containing materials, a succession of material-cells or chambers, means for supporting material therein, means for circulating a drying medium through said cells or chambers, successively, two series of boosters, one of which is positioned intermediate the exit from one cell or chamber and the inlet to the succeeding cell or chamber, means for feeding a heating medium to said boosters, and means for controlling at will the flow of the heating medium to the individual boosters.

18. In an apparatus for evaporating moisture-containing materials, a succession of material cells or chambers, means for supporting material therein, means for circulating a drying medium through said cells or chambers, boosters positioned in the line of flow of the drying medium, one of said boosters being positioned intermediate the exit from one cell and the inlet to the next cell, means for feeding a heating medium to said boosters, and means for controlling the flow of said heating medium to the boosters individually.

19. In an apparatus for evaporating moisture-containing materials, a succession of material cells or chambers, means for supporting material therein, means for circulating a drying medium through said cells or chambers, a preheater for initially heating said drying medium, boosters in the line of flow of the drying medium, one of said boosters being positioned intermediate the exit from one cell and the inlet to the next cell, means for feeding a heating medium to said preheater and to the boosters, and means for controlling the flow of the heating medium to the preheater and to each of said boosters.

20. In a drier, the combination with a main chamber, of two sets of heaters in the chamber positioned along opposite side walls, parallel trays extending between said heaters and spaced from each other to form intermediate flow channels, and a plurality of overlapping staggered flow directing members substantially parallel to said trays and positioned to divide the chamber into a series of material compartments and to direct the flow of the drying medium through said compartments successively and into contact with one of said heaters between its exit from each compartment and its entrance to the next compartment.

21. In a drier, the combination with a main chamber, of two sets of heaters in the chamber positioned along opposite side walls, horizontal trays closely spaced to produce intermediate flow channels extending between said heaters, and a plurality of horizontal overlapping staggered flow directing members positioned to divide the chamber into a series of superimposed material compartments and to direct the flow of the drying medium through said compartments successively and into contact with one of said heaters between its exit from each compartment and its entrance to the next compartment.

22. In a drier, the combination of a main chamber containing a plurality of overlapping staggered flow directing members dividing it into a series of superimposed compartments, heaters at opposite ends of the compartments, and a plurality of trays in each compartment extending between said heaters and substantially parallel to said flow directing members, and means for flowing a drying medium through said compartments successively into alternate contact with the material on said trays and with said heaters.

23. Drying apparatus, comprising a chamber, a plurality of staggered overlapping horizontal flow directing members forming a continuous tortuous flow passage in said chamber, sets of horizontal material trays between the overlapping portions of said flow directing members, the trays of each set being spaced to form flow channels between them, and reheaters located within said flow passage and adjacent the ends of the trays.

24. Drying apparatus, comprising a material chamber, means within said chamber dividing it into a plurality of parallel flow channels each of uniform thin flat cross section, a second material chamber, means within it dividing it into a plurality of parallel flow channels each of uniform thin flat cross section lying in different planes from the first mentioned flow channels, means for causing a drying medium to flow through the flow channels of said chambers successively, including means for changing the direction of the flow of the drying medium between its exit from the first chamber and its entrance to the second chamber, and means for reheating the drying medium located at the point at which its direction of flow is changed.

25. Drying apparatus, comprising a chamber, flow directing members forming in the chamber a continuous tortuous flow passage of substantially uniform cross section, the cross section of the passage being small in relation to that of the chamber, means for causing a drying medium to flow through the passage, and supports for the material to be dried and reheaters placed alternately in the passage.

26. Drying apparatus comprising a preheater chamber and a main chamber, flow directing members positioned within the main chamber and producing therein a continuous tortuous flow passage, a preheater within the preheater chamber for initially heating a drying medium to a desired temperature, two series of reheaters positioned within the flow channel adjacent opposite walls of the main chamber and operating to boost the drying medium for maintaining its temperature constant, and horizontal trays positioned within the flow channel and extending between the reheaters therein.

In testimony whereof I have hereunto signed my name.

GORDON DON HARRIS.